(12) United States Patent
Haggman et al.

(10) Patent No.: US 7,490,909 B1
(45) Date of Patent: Feb. 17, 2009

(54) REVERSIBLE HEAD REST FOR VEHICLE INFANT SEATS

(76) Inventors: Dale L. Haggman, 1625 Nottingham Dr., Newton, NC (US) 28658; Lisa R. Haggman, 1625 Nottingham Dr., Newton, NC (US) 28658

( * ) Notice: Subject to any disclaimer, the term of this patent is extended or adjusted under 35 U.S.C. 154(b) by 328 days.

(21) Appl. No.: 11/372,775

(22) Filed: Mar. 13, 2006

(51) Int. Cl.
*A47C 1/10* (2006.01)
(52) U.S. Cl. .......................... 297/397; 297/391; 5/636; 5/637; 5/922
(58) Field of Classification Search ................. 297/397, 297/391; 5/636, 637, 922
See application file for complete search history.

(56) References Cited

U.S. PATENT DOCUMENTS

| | | | | |
|---|---|---|---|---|
| 1,787,832 A * | 1/1931 | Mueller | ......................... | 5/636 |
| 2,983,310 A * | 5/1961 | Warlick et al. | .............. | 297/399 |
| 3,220,770 A * | 11/1965 | Schaeffer | ..................... | 297/395 |
| 3,608,964 A * | 9/1971 | Earl | ............................ | 297/397 |
| 4,060,863 A * | 12/1977 | Craig | ............................ | 5/644 |
| 4,731,890 A * | 3/1988 | Roberts | ........................ | 5/655 |
| 4,738,488 A * | 4/1988 | Camelio | ...................... | 297/383 |
| 4,838,611 A | 6/1989 | Talaugon | | |
| 5,205,611 A * | 4/1993 | Stephens | .................... | 297/391 |
| 5,339,472 A | 8/1994 | Yin | | |
| 5,383,711 A | 1/1995 | Houghteling | | |
| 5,486,037 A | 1/1996 | Harper | | |
| 5,669,665 A | 9/1997 | Nowak | | |
| 5,785,388 A * | 7/1998 | Curtis | ........................ | 297/482 |
| D402,832 S | 12/1998 | Lance | | |
| 6,088,855 A * | 7/2000 | Connolly | ....................... | 5/636 |
| 6,394,554 B1 * | 5/2002 | Hingle | ........................ | 297/482 |
| 6,748,615 B1 * | 6/2004 | Tiedemann | ..................... | 5/640 |
| 6,758,526 B2 * | 7/2004 | Marbutt | ....................... | 297/392 |
| 6,782,572 B1 * | 8/2004 | Jones | ............................ | 5/640 |
| 6,789,851 B2 * | 9/2004 | Smith | ........................ | 297/392 |
| 6,793,287 B2 * | 9/2004 | Dunk | ........................ | 297/397 |

* cited by examiner

*Primary Examiner*—Laurie K Cranmer

(57) ABSTRACT

A pillow includes a washable L-shaped body that has longitudinal and latitudinal regions. The longitudinal region is abutted against a lateral edge of an infant car seat such that the latitudinal region protrudes inwardly towards the car seat center. The latitudinal region has a medially disposed end provided with an arcuate top edge curving upwardly away from a latitudinal region bottom edge, forming a curvilinear lip that is spaced from the top edge and the longitudinal region affixing mechanisms. A mechanism is included for affixing the longitudinal region to the car seat such that the latitudinal edge can bias towards and away from the back rest, adjusting a location of the lip. A mechanism is included for affixing a longitudinal region top edge to a car seat rear side, allowing the body to be freely positioned along x-, y- and z-axes while remaining affixed to the car seat rear side.

18 Claims, 4 Drawing Sheets

REVERSIBLE HEAD REST FOR VEHICLE INFANT SEATS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to head rests and, more particularly, to a reversible head rest for vehicle infant seats for advantageously providing a cushioned support against which an infant can lay his/her head during transit.

2. Prior Art

One problem with the car seats which are commonly used for transporting infants and other small children in motor vehicles is that they do not provide proper support for the heads and necks of the children. As a result, children frequently experience discomfort when riding in such seats, particularly if they fall asleep and their heads fall to the side. This lack of support can cause a child to awaken prematurely due to the discomfort in his neck and, in the event of an accident, can result in a serious injury to the child.

A variety of apparatuses have been proposed by the prior art in attempts to solve this problem. However, the prior art devices suffer from various drawbacks including undesired restriction of the shoulders and arms of infants and small children, undesired covering and abutment with the top of the head, restriction of vision, lack of adjustability, incompatibility with some of the various types of retaining devices, and difficulty in cleaning. Furthermore, due to the delicate and weak nature of a baby's neck, it is preferable that a support apparatus not be tied about the neck. Rather, a need is seen for a flexible and light-weight neck support that will conform to the baby's neck and lend support thereto while maintaining the baby's head in an upright position.

Accordingly, a need remains for a reversible head rest for vehicle infant seats in order to overcome the above-noted shortcomings. The present invention satisfies such a need by providing an infant car seat head rest that is convenient and easy to use, grants effective support for an infant's head and neck, and is comfortable to use for extended periods of time. Long car rides have a tendency to make children, especially infants, sleepy. The reversible head rest for vehicle infant seats provides the support a toddler or infant needs to rest or sleep comfortably, without uncomfortable head and neck movements or strain.

Such a head rest provides a soft surface on which the child can lay his or her head as they fall asleep. Being able to fall asleep in a comfortable position advantageously keeps the child from becoming fussy and overtired during the car ride. Having the proper head and neck support also helps the child to breathe freely as he or she sleeps. Thus, with the child comfortably disposed in the car seat, parents are better able to concentrate on driving the car safely. In this way, the reversible head rest for vehicle infant seats enhances the safety of everyone in the vehicle.

BRIEF SUMMARY OF THE INVENTION

In view of the foregoing background, it is therefore an object of the present invention to provide a reversible head rest for vehicle infant seats. These and other objects, features, and advantages of the invention are provided by a pillow for advantageously providing a cushioned support against which an infant can conveniently lay his/her head during transit.

The pillow includes an L-shaped body that has monolithically formed longitudinal and latitudinal regions. Such a longitudinal region is directly abutted against a lateral edge of an infant car seat such that the latitudinal region protrudes inwardly towards a center of the infant car seat and terminates medially of a back rest of the infant car seat. The latitudinal region has a medially disposed end provided with an arcuate top edge curving upwardly away from a bottom edge of the latitudinal region such that a curvilinear lip is formed for effectively receiving an infant's head thereon. Such a curvilinear lip is spaced from the top edge affixing mechanism and the longitudinal region affixing mechanism respectively.

The L-shaped body preferably includes a single and unitary core that is formed from resiliently deformable foam material for advantageously and effectively adapting to a contour of a face of the infant while returning to an equilibrium position during non-use. A slip-on cover is positioned about the core and directly contacts an entire outer surface of the core for maintaining continuous surface area contact with the core when the infant head is rested against the core. Such a slip-on cover preferably includes a zipper for advantageously allowing the user to quickly remove the slip-on cover from the core. The L-shaped body is formed from washable material.

A mechanism is included for removably and directly affixing the longitudinal region of the L-shaped body directly to the lateral edge and the back rest of the infant car seat such that the latitudinal edge is free to bias towards and away from the back rest and thereby adjust a location of the curvilinear lip as needed. Such a longitudinal region affixing mechanism preferably includes a first elongated and rectangular fastening strip that has a front side provided with a hook and loop fastener and further has a rear side provided with a hook and loop fastener such that the first fastening strip can effectively be removed from the longitudinal edge and the lateral edge of the infant car seat respectively. The first fastening strip is directly conjoined to a lateral side of the longitudinal region. A second elongated and rectangular fastening strip has a front side provided with a hook and loop fastener and further has a rear side provided with a hook and loop fastener such that the second fastening strip can effectively be removed from a rear side of the L-shaped body and the back rest of the infant car seat respectively. Such a second fastening strip is directly conjoined to the rear side of the longitudinal region. The first and second fastening strips are spaced apart and independently engage the lateral edge and the back rest of the infant car seat respectively.

The longitudinal region affixing mechanism may further include a third elongated and rectangular fastening strip that has a front side provided with a hook and loop fastener and further has a rear side provided with a hook and loop fastener. The third fastening strip is directly conjoined to a front side of the longitudinal region so that the L-shaped body can be reversed and fastened to an opposite side of the infant car seat without having to detach the second fastening strip from the L-shaped body.

A mechanism is included for removably and directly affixing a top edge of the longitudinal region to a rear side of the infant car seat such that the L-shaped body can conveniently be freely positioned along an x-axis, y-axis and z-axis while remaining directly affixed to the rear side of the infant car seat. Such a top edge affixing mechanism may include an elongated and flexible strap that has axially opposed ends permanently attached directly to the top edge of the longitudinal region and the rear side of the infant car seat respectively. A top one of the ends is provided with a hook and loop fastener directly attached to a rear side thereof. A bottom one of the ends has a front side directly attached to the top edge and is spaced above the first and second fastening strips respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
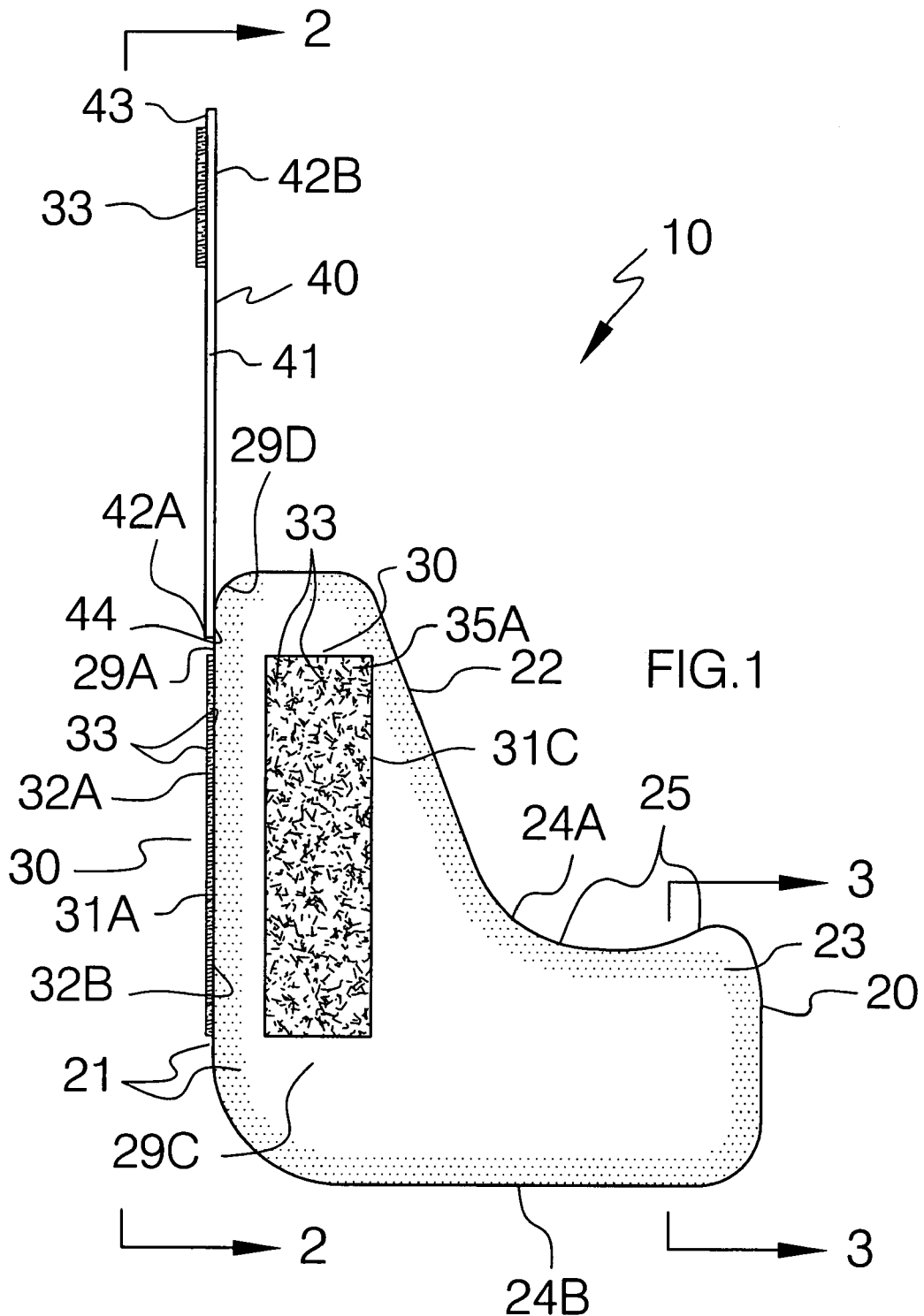
FIG. 1 is a front-elevational view showing a reversible head rest for vehicle infant seats, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-4 by the reference numeral 10 and is intended to provide a reversible head rest for vehicle infant seats. It should be understood that the apparatus 10 may be used to provide head and neck support many different types of applications and should not be limited in use to only infants and toddlers in their car seats.

Figure 2:
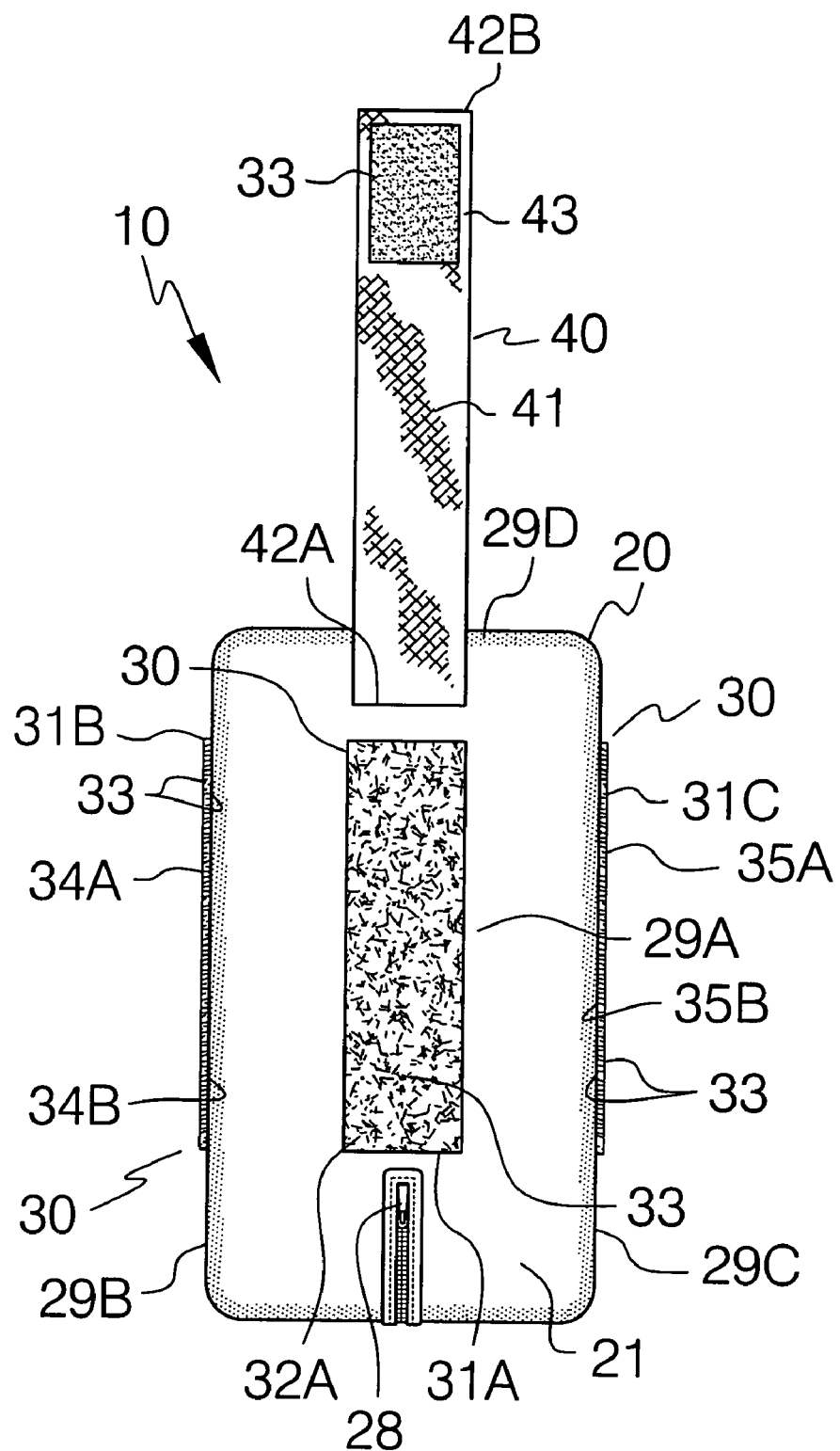
FIG. 2 is a side-elevational view of the apparatus shown in FIG. 1, viewed along line 2-2.
Figure 4:
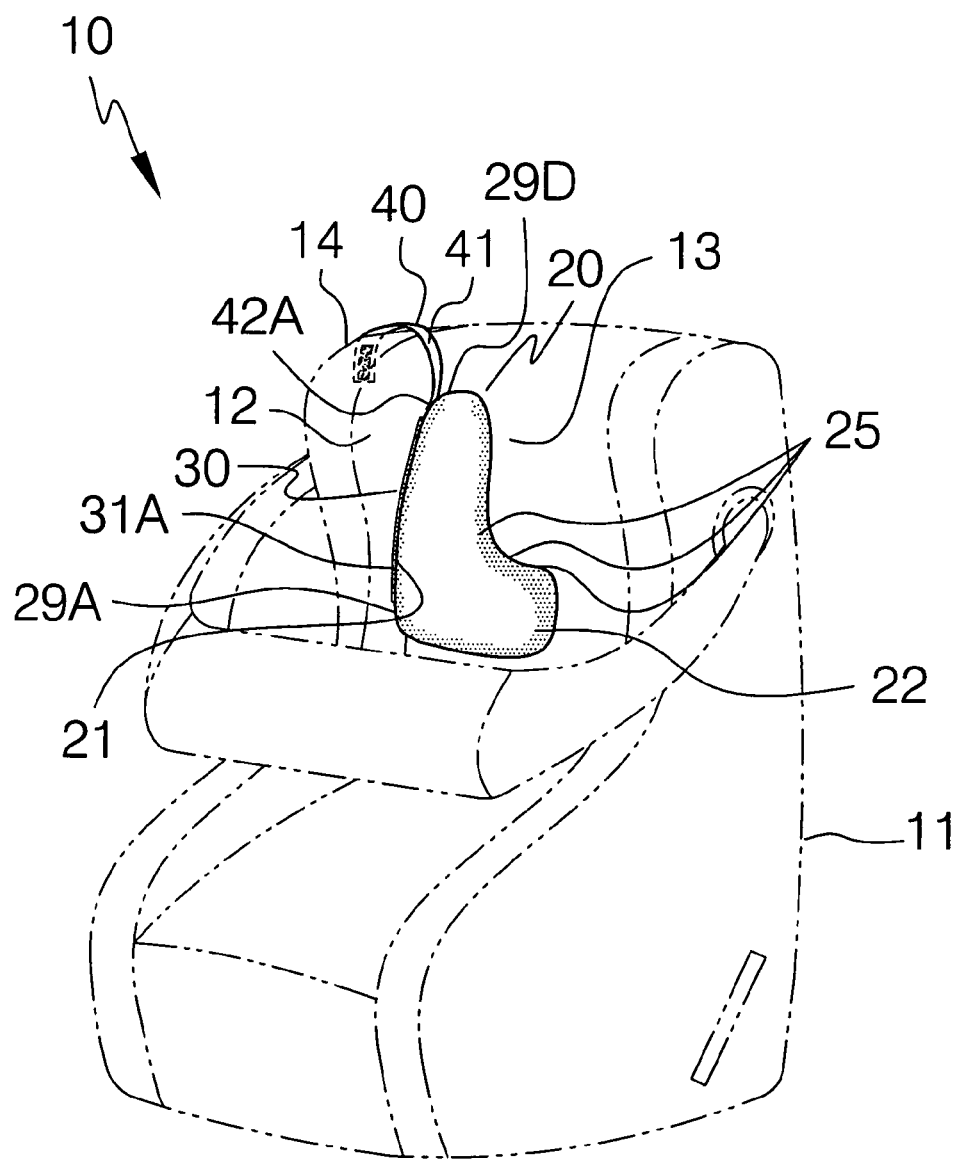
FIG. 4 is a perspective view of the apparatus shown in FIG. 1, showing the apparatus during operating conditions.

Referring initially to FIGS. 1, 2 and 4, the apparatus 10 includes an L-shaped body 20 that has monolithically formed longitudinal 21 and latitudinal 22 regions. Such a longitudinal region 21 is directly abutted, without the use of intervening elements, against a lateral edge 12 of an infant car seat 11 such that the latitudinal region 22 protrudes inwardly towards a center of the infant car seat 11 and terminates medially of a back rest 13 of the infant car seat 11. The latitudinal region 22 has a medially disposed end 23 provided with an arcuate top edge 24A curving upwardly away from a bottom edge 24B of the latitudinal region 22, which is essential such that a curvilinear lip 25 is formed for effectively and comfortably receiving an infant's head thereon. Such a curvilinear lip 25 is spaced from the top edge affixing mechanism 40 (described herein below) and the longitudinal region affixing mechanism 30 (described herein below) respectively.

Figure 3:
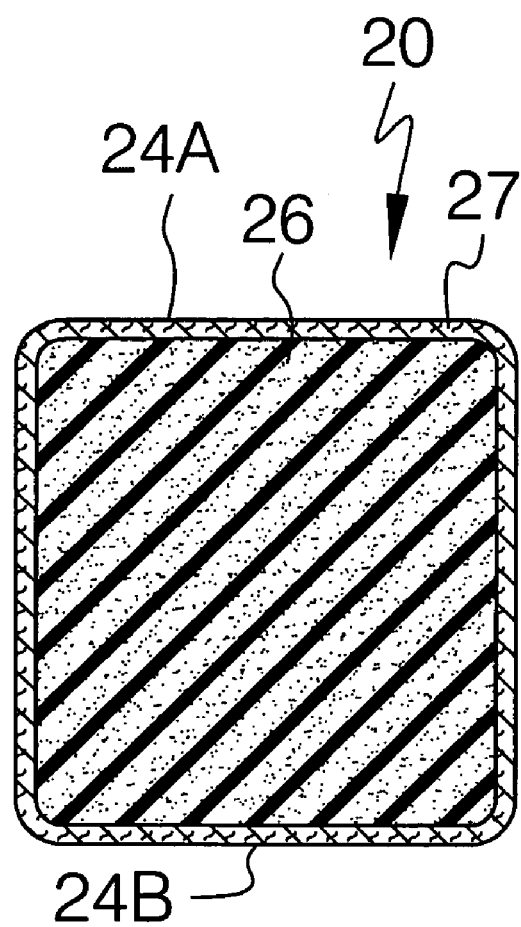
FIG. 3 is a cross-sectional view of the apparatus shown in FIG. 1, taken along line 3-3 and showing the resiliently deformable foam core thereof.

Referring to FIG. 3, the L-shaped body 20 includes a single and unitary core 26 that is formed from resiliently deformable foam material, which is crucial for advantageously and effectively adapting to a contour of a face of the infant while returning to an equilibrium position during non-use. A slip-on cover 27 is positioned about the core 26 and directly contacts, without the use of intervening elements, an entire outer surface of the core 26 for maintaining continuous surface area contact with the core 26 when the infant head is rested against the core 26. Such a slip-on cover 27 includes a zipper 28 that is important for advantageously allowing the user to quickly remove the slip-on cover 27 from the core 26, thus conveniently allowing a parent or caregiver to periodically wash the slip-on cover 27. The L-shaped body 20 is formed from washable material. Of course, the slip-on cover 27 may be produced in a variety of different colors and may have variously themed surface indicia imprinted thereon, as is obvious to a person of ordinary skill in the art.

Referring to FIGS. 1, 2 and 4 a mechanism 30 is included for removably and directly affixing the longitudinal region 21 of the L-shaped body 20 directly to the lateral edge 12 and the back rest 13 of the infant car seat 11, which is vital such that the latitudinal edge 22 is free to bias towards and away from the back rest 13 and thereby conveniently adjust a location of the curvilinear lip 25 as needed. Such a longitudinal region affixing mechanism 30 includes a first elongated and rectangular fastening strip 31A that has a front side 32A provided with a hook and loop fastener 33 and further has a rear side 32B provided with a hook and loop fastener 33, which is crucial such that the first fastening strip 31A can effectively be removed from the longitudinal region 21 and the lateral edge 12 of the infant car seat 11 respectively. The first fastening strip 31A is directly conjoined, without the use of intervening elements, to a lateral side 29A of the longitudinal region 21.

Referring to FIG. 2, a second elongated and rectangular fastening strip 31B has a front side 34A provided with a hook and loop fastener 33 and further has a rear side 34B provided with a hook and loop fastener 33, which is important such that the second fastening strip 31B can effectively be removed from a rear side 29B of the L-shaped body 20 and the back rest 13 of the infant car seat 11 respectively. Such a second fastening strip 31B is directly conjoined, without the use of intervening elements, to the rear side 29B of the longitudinal region 21. The first 31A and second 31B fastening strips are spaced apart and independently engage the lateral edge 12 and the back rest 13 of the infant car seat 11 respectively.

Referring to FIGS. 1 and 2, the longitudinal region affixing mechanism 30 further includes a third elongated and rectangular fastening strip 31C that has a front side 35A provided with a hook and loop fastener 33 and further has a rear side 35B provided with a hook and loop fastener 33. The third fastening strip 31C is directly conjoined, without the use of intervening elements, to a front side 29C of the longitudinal region 21, which is essential and advantageous so that the L-shaped body 20 can be reversed and fastened to an opposite side of the infant car seat 11 without having to detach the second fastening strip 31B from the L-shaped body 20. The removable nature of the second 31B and third 31C fastening strips is important and advantageous for allowing a parent to detach either the second 31B or third 31C fastening strips depending on the orientation of the L-shaped body 20 such that the fastening strip 31 that is not connected to the back rest 13 of the car seat 11 does not irritate the infant's skin.

Referring to FIGS. 1, 2 and 4, a mechanism 40 is included for removably and directly affixing a top edge 29D of the longitudinal region 21 to a rear side 14 of the infant car seat 11, which is critical such that the L-shaped body 20 can conveniently be freely positioned along an x-axis, y-axis and z-axis while remaining directly affixed, without the use of intervening elements, to the rear side 14 of the infant car seat 11. Such a top edge affixing mechanism 40 includes an elongated and flexible strap 41 that has axially opposed ends 42A, 42B permanently attached directly, without the use of intervening elements, to the top edge 29D of the longitudinal region 21 and the rear side 14 of the infant car seat 11 respectively. A top one 42B of the ends is provided with a hook and loop fastener 33 directly attached, without the use of intervening elements, to a rear side 43 thereof. A bottom one 42A of the ends has a front side 44 directly attached, without the use of intervening elements, to the top edge 29D and is spaced above the first 31A, second 31B and third 31C fastening strips respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A pillow for providing a cushioned support against which an infant can lay his/her head during transit, said pillow comprising:
    an L-shaped body having monolithically formed longitudinal and latitudinal regions, said longitudinal region being directly abutted against a lateral edge of an infant car seat such that said latitudinal region protrudes inwardly towards a center of the infant car seat and terminates medially of a back rest of the infant car seat, said latitudinal region having a medially disposed end provided with an arcuate top edge curving upwardly away from a bottom edge of said latitudinal region such that a curvilinear lip is formed for receiving an infant head thereon;
    means for removably and directly affixing said longitudinal region of said L-shaped body directly to the lateral edge and the back rest of the infant car seat such that said latitudinal region is selectively positional towards and away from the back rest and thereby adjust a location of said curvilinear lip as needed; and
    means for removably and directly affixing a top edge of said longitudinal region to a rear side of the infant car seat such that said L-shaped body can be freely positioned along an x-axis, y-axis and z-axis while remaining directly affixed to the rear side of the infant car seat.

2. The apparatus of claim 1, wherein said longitudinal region affixing means comprises:
    a first elongated and rectangular fastening strip having a front side provided with a hook and loop fastener and further having a rear side provided with a hook and loop fastener such that said first fastening strip can be removed from said longitudinal edge and the lateral edge of the infant car seat respectively, said first fastening strip being directly conjoined to a lateral side of said longitudinal region; and
    a second elongated and rectangular fastening strip having a front side provided with a hook and loop fastener and further having a rear side provided with a hook and loop fastener such that said second fastening strip can be removed from a rear side of said L-shaped body and the back rest of the infant car seat respectively, said second fastening strip being directly conjoined to said rear side of said longitudinal region;
    wherein said first and second fastening strips are spaced apart and independently engage the lateral edge and the back rest of the infant car seat respectively.

3. The apparatus of claim 2, wherein said longitudinal region affixing means further comprises:
    a third elongated and rectangular fastening strip having a front side provided with a hook and loop fastener and further having a rear side provided with a hook and loop fastener, said third fastening strip being directly conjoined to a front side of said longitudinal region so that said L-shaped body can be reversed and fastened to an opposite side of the infant car seat without having to detach said second fastening strip from said L-shaped body.

4. The apparatus of claim 1, wherein said top edge affixing means comprises:
    an elongated and flexible strap having axially opposed ends permanently attached directly to said top edge of said longitudinal region and the rear side of the infant car seat respectively;
    a top one of said ends being provided with a hook and loop fastener directly attached to a rear side thereof;
    a bottom one of said ends having a front side directly attached to said top edge and being spaced above said first and second fastening strips respectively.

5. The apparatus of claim 1, wherein said L-shaped body comprises:
    a single and unitary core formed from resiliently deformable foam material for adapting to a contour of a face of the infant while returning to an equilibrium position during non-use; and
    a slip-on cover positioned about said core and directly contacting an entire outer surface of said core for maintaining continuous surface area contact with said core when the infant head is rested against said core.

6. The apparatus of claim 5, wherein said slip-on cover comprises:
a zipper for allowing the user to quickly remove said slip-on cover from said core.

7. A pillow for providing a cushioned support against which an infant can lay his/her head during transit, said pillow comprising:
an L-shaped body having monolithically formed longitudinal and latitudinal regions, said longitudinal region being directly abutted against a lateral edge of an infant car seat such that said latitudinal region protrudes inwardly towards a center of the infant car seat and terminates medially of a back rest of the infant car seat, said latitudinal region having a medially disposed end provided with an arcuate top edge curving upwardly away from a bottom edge of said latitudinal region such that a curvilinear lip is formed for receiving an infant head thereon, wherein said L-shaped body is formed from washable material;
means for removably and directly affixing said longitudinal region of said L-shaped body directly to the lateral edge and the back rest of the infant car seat such that said latitudinal region is selectively positional towards and away from the back rest and thereby adjust a location of said curvilinear lip as needed; and
means for removably and directly affixing a top edge of said longitudinal region to a rear side of the infant car seat such that said L-shaped body can be freely positioned along an x-axis, y-axis and z-axis while remaining directly affixed to the rear side of the infant car seat.

8. The apparatus of claim 7, wherein said longitudinal region affixing means comprises:
a first elongated and rectangular fastening strip having a front side provided with a hook and loop fastener and further having a rear side provided with a hook and loop fastener such that said first fastening strip can be removed from said longitudinal edge and the lateral edge of the infant car seat respectively, said first fastening strip being directly conjoined to a lateral side of said longitudinal region; and
a second elongated and rectangular fastening strip having a front side provided with a hook and loop fastener and further having a rear side provided with a hook and loop fastener such that said second fastening strip can be removed from a rear side of said L-shaped body and the back rest of the infant car seat respectively, said second fastening strip being directly conjoined to said rear side of said longitudinal region;
wherein said first and second fastening strips are spaced apart and independently engage the lateral edge and the back rest of the infant car seat respectively.

9. The apparatus of claim 8, wherein said longitudinal region affixing means further comprises:
a third elongated and rectangular fastening strip having a front side provided with a hook and loop fastener and further having a rear side provided with a hook and loop fastener, said third fastening strip being directly conjoined to a front side of said longitudinal region so that said L-shaped body can be reversed and fastened to an opposite side of the infant car seat without having to detach said second fastening strip from said L-shaped body.

10. The apparatus of claim 7, wherein said top edge affixing means comprises:

an elongated and flexible strap having axially opposed ends permanently attached directly to said top edge of said longitudinal region and the rear side of the infant car seat respectively;
a top one of said ends being provided with a hook and loop fastener directly attached to a rear side thereof;
a bottom one of said ends having a front side directly attached to said top edge and being spaced above said first and second fastening strips respectively.

11. The apparatus of claim 7, wherein said L-shaped body comprises:
a single and unitary core formed from resiliently deformable foam material for adapting to a contour of a face of the infant while returning to an equilibrium position during non-use; and
a slip-on cover positioned about said core and directly contacting an entire outer surface of said core for maintaining continuous surface area contact with said core when the infant head is rested against said core.

12. The apparatus of claim 11, wherein said slip-on cover comprises:
a zipper for allowing the user to quickly remove said slip-on cover from said core.

13. A pillow for providing a cushioned support against which an Infant can lay his/her head during transit, said pillow comprising:
an L-shaped body having monolithically formed longitudinal and latitudinal regions, said longitudinal region being directly abutted against a lateral edge of an infant car seat such that said latitudinal region protrudes inwardly towards a center of the infant car seat and terminates medially of a back rest of the infant car seat, said latitudinal region having a medially disposed end provided with an arcuate top edge curving upwardly away from a bottom edge of said latitudinal region such that a curvilinear lip is formed for receiving an infant head thereon, wherein said curvilinear lip is spaced from a top edge affixing means and a longitudinal region affixing means respectively, wherein said L-shaped body is formed from washable material;
said longitudinal region affixing means removably and directly affixing said longitudinal region of said L-shaped body directly to the lateral edge and the back rest of the infant car seat such that said latitudinal edge is selectively positional towards and away from the back rest and thereby adjust a location of said curvilinear lip as needed; and
said top edge affixing means removably and directly affixing a top edge of said longitudinal region to a rear side of the infant car seat such that said L-shaped body can be freely positioned along an x-axis, y-axis and z-axis while remaining directly affixed to the rear side of the infant car seat.

14. The apparatus of claim 13, wherein said longitudinal region affixing means comprises:
a first elongated and rectangular fastening strip having a front side provided with a hook and loop fastener and further having a rear side provided with a hook and loop fastener such that said first fastening strip can be removed from said longitudinal edge and the lateral edge of the infant car seat respectively, said first fastening strip being directly conjoined to a lateral side of said longitudinal region; and
a second elongated and rectangular fastening strip having a front side provided with a hook and loop fastener and further having a rear side provided with a hook and loop fastener such that said second fastening strip can be removed from a rear side of said L-shaped body and the back rest of the infant car seat respectively, said second fastening strip being directly conjoined to said rear side of said longitudinal region;

wherein said first and second fastening strips are spaced apart and independently engage the lateral edge and the back rest of the infant car seat respectively.

15. The apparatus of claim 14, wherein said longitudinal region affixing means further comprises:

a third elongated and rectangular fastening strip having a front side provided with a hook and loop fastener and further having a rear side provided with a hook and loop fastener, said third fastening strip being directly conjoined to a front side of said longitudinal region so that said L-shaped body can be reversed and fastened to an opposite side of the infant car seat without having to detach said second fastening strip from said L-shaped body.

16. The apparatus of claim 13, wherein said top edge affixing means comprises:

an elongated and flexible strap having axially opposed ends permanently attached directly to said top edge of said longitudinal region and the rear side of the infant car seat respectively;

a top one of said ends being provided with a hook and loop fastener directly attached to a rear side thereof;

a bottom one of said ends having a front side directly attached to said top edge and being spaced above said first and second fastening strips respectively.

17. The apparatus of claim 13, wherein said L-shaped body comprises:

a single and unitary core formed from resiliently deformable foam material for adapting to a contour of a face of the infant while returning to an equilibrium position during non-use; and a slip-on cover positioned about said core and directly contacting an entire outer surface of said core for maintaining continuous surface area contact with said core when the infant head is rested against said core.

18. The apparatus of claim 17, wherein said slip-on cover comprises:

a zipper for allowing the user to quickly remove said slip-on cover from said core.

* * * * *